United States Patent

Strybel

[15] 3,648,725
[45] Mar. 14, 1972

[54] PIERCING VALVE

[72] Inventor: Richard V. Strybel, Elk Grove Village, Ill.
[73] Assignee: Imperial-Eastman Corporation, Chicago, Ill.
[22] Filed: Feb. 2, 1970
[21] Appl. No.: 7,916

[52] U.S. Cl. ............................................ 137/318, 285/197
[51] Int. Cl. ................................................ F16k 43/00
[58] Field of Search ............... 137/316, 317, 318; 269/296, 269/321 N; 285/61, 197, 198, 199; 77/37–42

[56] References Cited

UNITED STATES PATENTS

| 1,071,289 | 8/1913 | Bader | 269/321 N |
| 3,038,490 | 6/1962 | Yocum | 137/318 |
| 3,162,211 | 12/1964 | Barusch | 137/318 |
| 3,218,059 | 11/1965 | Andrew | 269/321 N |
| 3,247,862 | 4/1966 | Burke | 137/318 |
| 3,252,475 | 5/1966 | Jones | 137/318 |
| 3,272,211 | 9/1966 | Leopold, Jr. et al. | 137/318 X |
| 3,336,937 | 8/1967 | Ehrens et al. | 137/318 |
| 3,509,905 | 5/1970 | Mullins | 137/318 |

*Primary Examiner*—M. Cary Nelson
*Assistant Examiner*—David R. Matthews
*Attorney*—Hofgren, Wegner, Allen, Stellman & McCord

[57] ABSTRACT

A piercing valve adapted to be secured about a duct such as a tube and provided with a piercing element arranged to be selectively forced through the wall of the tube to form a pierced opening therein. Valve means are associated with the piercing element for controlling fluid flow communication with the interior of the duct upon the piercing thereof. A clamp element is provided for association with a body member of the valve permitting facilitated connection of the valve to any one of a plurality of different size ducts.

15 Claims, 5 Drawing Figures

PATENTED MAR 14 1972
3,648,725
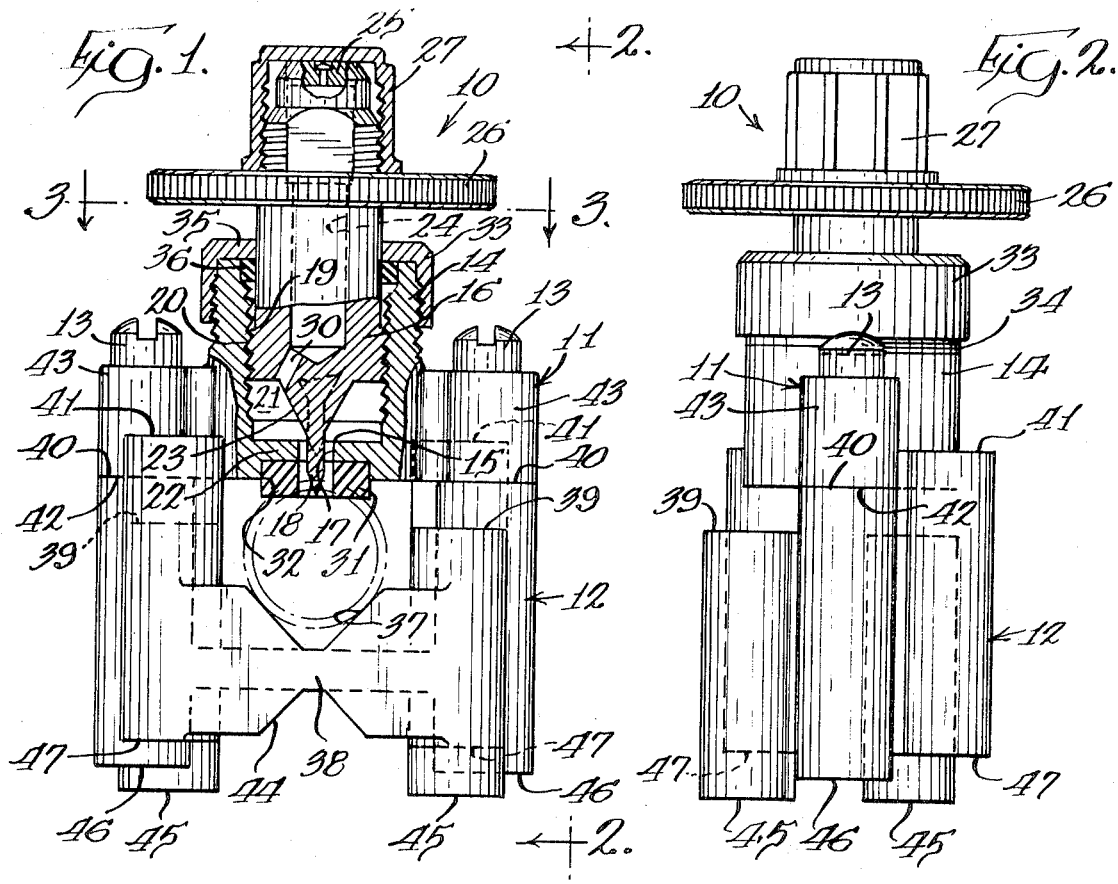
Fig.1.
Fig.2.
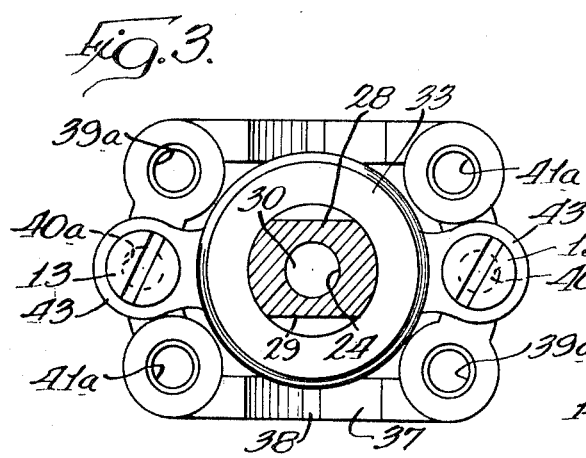
Fig.3.
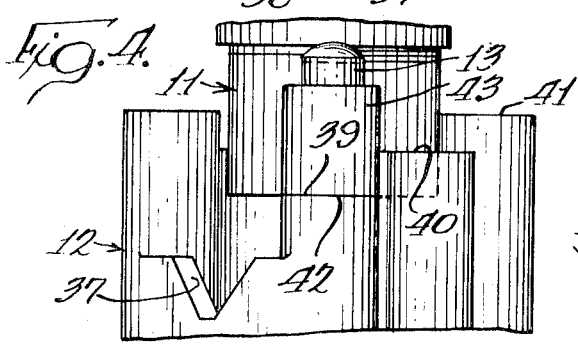
Fig.4.
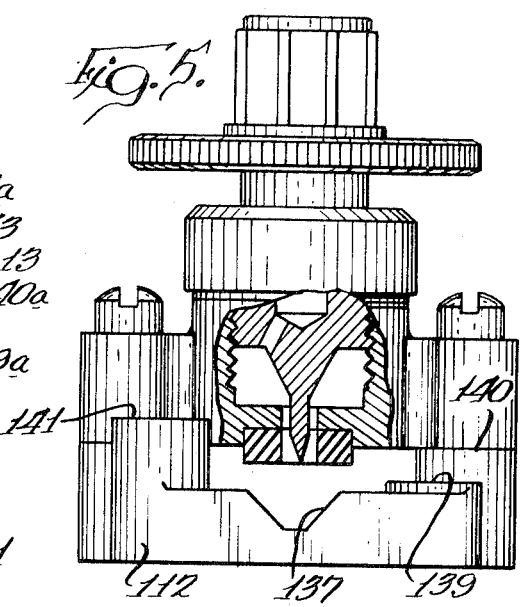
Fig.5.
Inventor:
Richard V. Strybel
By Hofgren, Wegner,
Allen, Stellman & McCord
Attys

3,648,725

PIERCING VALVE

BACKGROUND OF THE INVENTION

1. Field of the Invention

This invention relates to valves and in particular to piercing valves.

2. Description of the Prior Art

In one form of valve, valve housing means are secured about a duct such as a tube and an associated piercing element is forcibly urged through the wall of the tube to pierce a hole therein, thereby providing fluid flow communication with the interior of the duct. Valve means are associated with the piercing element to control the fluid flow communication. It is desirable to adapt such piercing valves for use with different size ducts. DIfferent methods of providing such adaptability heretofore employed in the art included stepped recesses in the cooperating clamping portions of the valve adapted to engage selectively different size tubes. Sets of different clamping elements alternatively are utilized to accommodate the different size tubes.

SUMMARY OF THE INVENTION

The present invention comprehends an improved piercing valve construction wherein a clamp element is associated with the body of the valve in a unique manner to provide for a plurality of different spacings of the clamp element duct-engaging surface from the body to accommodate any one of a plurality of different size ducts.

The clamp element includes a plurality of cooperating sets of shoulders selectively engageable with a pair of shoulders on the body to provide the desirable selective spacing.

The clamp element may be reversible to provide further additional selective spacing by means of an oppositely opening duct-engaging recess coordinated with one or more pairs of oppositely facing shoulders.

The piercing valve provides positive metal-to-metal abutment for effectively positive spacing of the duct-engaging portion of the clamp element from the body. The valve may comprise effectively a two-piece assembly wherein the means for securing the clamp element to the body may be captured by the body. If desired, a plurality of different clamp elements may be utilized.

A cap is provided on the body to prevent the valve member from being inadvertently removed from the body. The valve member may be provided with tool-engaging surfaces for facilitated operation thereof.

The valve means may include a plurality of valves connected in series. The piercing element may be fixedly associated with a first valve member so that upon withdrawal of the piercing element from the duct, opening of the valve is automatically effected. Control of fluid flow communication with the interior of the duct may be had by the valve associated with the piercing element or by the additional valve means as desired. The additional valve means may comprise a spring biased, normally closed valve means.

The entire piercing valve assembly is made to be relatively small in a direction radially of the tube to which it is to be connected so that it may be readily positioned in any direction about the tube. The means for securing the clamp element to the body may comprise slotted screw means for effectively minimizing the radial extension thereof.

BRIEF DESCRIPTION OF THE DRAWING

Other features and advantages of the invention will be apparent from the following description taken in connection with the accompanying drawing wherein:

FIG. 1 is a front elevation of a piercing valve embodying the invention with portions shown in diametric section to facilitate illustration thereof;

FIG. 2 is a right side elevation thereof, looking in the direction of the arrows as shown in FIG. 1;

FIG. 3 is a horizontal section taken substantially along the line 3—3 of FIG. 1;

FIG. 4 is a fragmentary right side elevation showing a modified arrangement of the clamp element such as for use in securing a different size duct to the valve; and FIG. 5 is a fragmentary front elevation of a modified form of piercing valve embodying the invention.

DESCRIPTION OF THE PREFERRED EMBODIMENTS

In the exemplary embodiment of FIGS. 1–4, a piercing valve generally designated 10 is shown to comprise a body 11 and a clamp element 12 selectively secured together by suitable retaining means such as screws 13. Body 11 includes a cylindrical mid-portion 14 defining at its lower end a valve seat 15 adapted for cooperation with a valve member 16 for selectively closing an opening 17 through the lower end of the body. Valve member 16 includes a lowermost piercing element 18 adapted to pierce a duct D secured between the clamp element 12 and the body 11 as illustrated in FIG. 1.

Axial movement of valve member 16 is effected by a rotation thereof about its longitudinal axis as a result of the threaded coaction of a lower threaded portion 19 of valve member 16 with a confronting threaded portion 20 of the body mid-portion 14. As seen in FIG. 1, threaded portion 20 defines a valve chamber 21 above the bottom wall 22 of the body portion through which valve member 16 extends. The valve means includes a frustoconical lower surface adapted to engage the valve seat 15 at the lowermost extreme of travel of the valve member thereby to preclude communication through opening 17 to chamber 21.

Valve member 16 further includes an outwardly opening axial recess 24 normally closed at its outer end by a spring biased valve 25 herein of the conventional Schroeder valve type. The valve member may be provided with an annularly enlarged single manipulating portion 26 and a cover 27 may be threadedly secured to the outer end of the valve member to overlie valve 25 and extend into engagement with the manipulating portion 26, thereby to cap the outer end of the valve member. The mid-portion 28 of the valve member may be provided with flats 29, as shown in FIG. 3, for engagement by a suitable tool, such as a wrench, to provide torquing of the valve member to effect penetration of the piercing element through the duct wall. A passage 30 is provided through the lower end of the valve member to provide communication between body chamber 21 and recess 24 as best seen in FIG. 1. An annular sealing gasket 31 is carried on the underside of the bottom wall 22 in a suitable recess 32 to project downwardly for sealing engagement with the wall of the duct D about the piercing element and to have the opening produced by the piercing element in the duct wall, thereby to provide sealed communication between the interior of duct D and valve chamber 21. A cap 33 is threadedly secured to an externally threaded upper portion 34 of the body portion 14 and includes an upper radial wall 35 extending to valve member portion 28. An annular seal, such as O-ring 36, is compressed between cap wall 35, valve member portion 28, and body mid-portion 14 to seal the valve member 16 to the body member above valve chamber 21. Further, wall 35 effectively precludes withdrawal of the valve member fully from the body portion 14 by interference with threaded portion 19 of the valve member.

Clamp element 12 defines a V-shaped duct-engaging surface in a mid-portion 38 thereof. At opposite sides of mid-portion 38, clamp element 12 is provided with a series of shoulders 39, 40, and 41, which are at different spacings above the V-shaped recess 37. Body 11 is provided with a pair of downwardly facing shoulders 42 in a pair of lug portions 43 at the opposite sides of mid-portion 14. Screws 13 extend downwardly through the lug portions 43 to threadedly engage threaded recesses 39a, 40a, and 41a in the respective shoulders 39, 40, and 41.

As each pair of shoulders is spaced differently from the tube-engaging surface 37, the arrangement of the valve with the different shoulders selectively in engagement with shoulders 42 of the body provides three different spacings of surface 37 from the body to accommodate correspondingly different size tubes D. As shown in FIG. 2, when shoulders 40 are aligned with shoulders 42, a medium spacing of surface 37 from the body is provided. As shown in FIG. 4, when shoulders 39 are aligned with shoulders 42, a lesser spacing of surface 37 from the body 11 is provided. A greater spacing of surface 37 from the body is obtained by juxtaposing shoulders 41 to shoulders 42. Thus, a wide range of duct sizes may be readily accommodated by clamp element 12 by simple selective positioning of the clamp element relative to the body shoulders 42. The tube-engaging surface 37 is a simple V-shaped surface, as shown in FIG. 1, while yet being adapted to accommodate the wide range of tube sizes.

As seen best in FIG. 1, clamp element 12 may be provided with a second tube-engaging surface 44 opening oppositely from surface 37. A second set of three differently spaced shoulders 45, 46, and 47 are provided on the bottom of clamp element 12 for cooperation with surface 42 to accommodate three further different size tubes D. Illustratively, shoulders 39, 40, 41, 45, 46, and 47 may be adapted for use in connection with tubes having diameters of 3/8", 1/2", 5/8", 5/16", 1/4" and 3/16", respectively. V-shaped surfaces 37 and 44 may have an angularity of approximately 90° as desired. The piercing valve may be formed of suitable material, such as metal. Gasket 31 may be retained in place on body bottom wall 22 by suitable means, such as adhesive means, and gasket 31 may be formed of a suitable sealing material, such as neoprene rubber. The shoulder abutments discussed above provide a positive metal-to-metal stop affording accurate positioning of the different size tubes for improved mounting of the valve thereon. As the valve effectively comprises a two-piece unit, facilitated handling and maintenance of the valve are provided.

In one preferred embodiment, the clamp element comprises a clamp element such as clamp element 112, as shown in FIG. 5, having only a single set of shoulders 139, 140, and 141, with a single upwardly opening tube-engaging recess surface 139. Thus, the piercing valve body may be utilized with any one of a plurality of different clamp elements as desired.

In use, the operator, after separating the clamp element from the body by suitable manipulation of screws 13, disposes the body with gasket 31 engaging the portion of the duct D to be pierced. Piercing element 18 is at this time in a retracted position as shown in dotted lines in FIG. 1. The appropriate clamp element is then secured to the body by abutment of the shoulders thereof corresponding to the diameter of the duct and the body and clamp element then fixedly secured together by the threading of screws 13 into the threaded recess of the selected clamp element shoulders aligned with the body shoulders 42. Such assembly of the valve on the duct causes the duct to compress the gasket 31 to approximately the broken line position of the duct D, as shown in FIG. 1.

The user then suitably torques the valve member 16 to advance the piercing element 18 through the wall of the duct thereby to provide an opening in the duct. The piercing element is then withdrawn to the full line position of FIG. 1 where upon communication is provided between the interior of duct D and valve chamber 21. Fluid flow may then be permitted as desired from chamber 21 through passage 30 and recess 24 to outer control valve 25. Suitable connection to valve 25 is provided by removal of cover 27 and threaded attachment of the connecting means to the upper end of the valve member. Enlargement knob 26 may be utilized to control the closure of valve member 23 against valve seat 15 to provide a series arrangement of this valve with valve 25. It should be noted that the piercing of the duct D is effected only after the valve is positively secured to the duct by the clamp element. Thus, the opening and closing of the lower valve 23-15 provides a controlled sealed connection to the pierced duct.

The piercing operation is conducted separately from the mounting operation so that each of the operations may be controlled with maximum facility and efficiency.

The installation of valve 10 on duct D is extremely simple while yet the valve is economical of construction and provides for long, trouble-free life. When the connection to the piercing valve through valve 25 is disconnected, the cover 27 may be replaced to prevent dirt or foreign matter from affecting the valve 25.

The foregoing disclosure of specific embodiments is illustrative of the broad inventive concepts comprehended by the invention.

I claim:

1. A piercing valve comprising: a body; valve means carried by said body and having a piercing element; compressible seal means circumjacent said piercing element; means for selectively moving said piercing element axially through said seal means to pierce a duct and provide sealed communication between the interior of the duct and said valve means; and means for securing said body in operative association with the duct to permit said element to pierce said duct, including a clamp element having a duct-engaging surface and cooperating means on said body and clamp element for positioning said duct-engaging surface in any one of a plurality of preselected different spacings from said body in alignment with said piercing element whereby said piercing valve may be secured to any one of a plurality of different size ducts to provide preselected penetration of the duct wall to effect a valved fluid flow connection to the duct with preselected sealing compression of said seal means.

2. The piercing valve of claim 1 wherein said cooperating means comprises a plurality of shoulders on one of said body and clamp elements spaced apart in the direction of movement of said piercing element and means for securing said body and clamp element together with the other of said body and clamp element selectively abutting a selected one of said shoulder means.

3. The piercing valve of claim 1 wherein said positioning means defines positive abutment means accurately positively spacing said duct-engaging surface from said body.

4. The piercing valve of claim 1 wherein said cooperating means includes screw means retained captive on one of said body and clamp element.

5. The piercing valve of claim 1 wherein said clamp element is reversibly associatable with said body member and includes a pair of oppositely facing duct-engaging surfaces for selectively engaging the duct with the clamp element in its alternative reversible positions.

6. The piercing valve of claim 1 wherein said clamp element is provided with a plurality of spaced duct-engaging surfaces and said cooperating means includes means for selectively positioning the respective surfaces alternatively in alignment with said piercing element.

7. The piercing valve of claim 1 wherein said valve means includes an integral piercing element, a hollow stem, and a port providing communication from externally adjacent said piercing element to within said hollow stem, and means for connecting fluid flow means to said hollow stem.

8. The piercing valve of claim 1 including means for selectively preventing withdrawal of said valve means from said body.

9. The piercing valve of claim 1 wherein said valve means includes flat means arranged to be engaged by a wrench for rotating said valve means about the axis of said piercing element, and thread means on said body and valve means for providing selective forward and rearward movement of said piercing element.

10. The piercing valve of claim 1 wherein said valve means includes a series of valves requiring each to be open to pass fluid from said duct outwardly through said valves.

11. The piercing valve of claim 1 wherein an annular seal is carried by said body, and said clamp element causes the tube to compress said seal sealingly against the duct and body, said piercing element passing axially through said seal whereby said duct is sealed to the body upon a piercing of the duct by said piercing element.

12. The piercing valve of claim 1 wherein said cooperating means includes slotted screws providing effectively minimum extension of said piercing valve radially from the duct for facilitated installation about the duct.

13. A piercing valve comprising: a body; first valve means carried by said body and having a piercing element; compressible seal means circumjacent said piercing element; means for selectively moving said piercing element axially through said seal means to pierce a duct and provide sealed communication between the interior of the duct and said valve means; means for securing said body in operative association with the duct to permit said element to pierce said duct, including a clamp element having a duct-engaging surface and cooperating means on said body and clamp element for positioning said duct-engaging surface in any one of a plurality of preselected different spacings from said body in alignment with said piercing element whereby said piercing valve may be secured to any one of a plurality of different size ducts to provide preselected penetration of the duct wall to effect a valved fluid flow connection to the duct with preselected sealing compression of said seal means; and second valve means connected in series with said first valve means for selectively preventing fluid flow from said duct through said first valve means notwithstanding said first valve means being disposed in an open condition.

14. The piercing valve of claim 13 wherein said second valve means comprises a spring biased, normally closed valve.

15. The piercing valve of claim 13 wherein said first and second valve means are coaxially aligned.

* * * * *